United States Patent [19]

Jensen et al.

[11] Patent Number: 5,139,049

[45] Date of Patent: Aug. 18, 1992

[54] REFRIGERATION SYSTEM SERVICE ADAPTER

[75] Inventors: Jon A. Jensen, New Baltimore; Steven M. Knowles, Leslie; Robert A. Laipply, Parma, all of Mich.

[73] Assignee: Aeroquip Corporation, Jackson, Mich.

[21] Appl. No.: 614,312

[22] Filed: Nov. 15, 1990

[51] Int. Cl.⁵ .............................. F16L 37/28
[52] U.S. Cl. ..................... 137/614.05; 137/614.03
[58] Field of Search ............ 137/614.03, 614.04, 137/614.05, 614.06

[56] References Cited

U.S. PATENT DOCUMENTS

| | | | |
|---|---|---|---|
| 2,739,612 | 3/1956 | Hansen | 137/614.05 |
| 3,687,161 | 8/1972 | Grguric et al. | 137/614.05 |
| 4,502,662 | 3/1985 | Maldavs et al. | 137/614.05 |
| 4,892,117 | 1/1990 | Spalink et al. | 137/614.03 |
| 4,921,013 | 5/1990 | Spalink et al. | 137/614.05 |
| 5,076,324 | 12/1991 | Herman et al. | 137/614.06 |

Primary Examiner—A. Michael Chambers

[57] ABSTRACT

A refrigeration system service coupling having a valved service adapter employing a spring biased sleeve valve to maintain the adapter valve in a closed no flow condition except when the service adapter is properly connected to a charging port of predetermined configuration and capable of retaining the service adapter sleeve valve to permit opening of the service adapter valve upon the service adapter being properly connected to the charging port.

6 Claims, 4 Drawing Sheets

REFRIGERATION SYSTEM SERVICE ADAPTER

BACKGROUND OF THE INVENTION

Servicing couplings are commonly employed with refrigeration systems to permit the charging and evacuation of the refrigeration circuit as taught in assignee's U.S. Pat. Nos. 4,892,117 and 4,921,013. Such couplings, conventionally, utilize a charging port having a Schrader valve, and a service adapter having a threaded connector for cooperating with the charging port attached thereto having a fixed valve actuator for displacing the Schrader valve and permitting refrigerant to flow through the coupling and into the refrigeration system.

Schrader valve type servicing systems rely upon a spring biased valve within the Schrader valve to automatically close upon the service adapter being removed from the charging port. The flow of refrigerant through the service adapter is generally controlled by a manually operated valve mounted upon the refrigerant storage bottle or cylinder.

It is an object of the present invention to provide a refrigeration service coupling utilizing a charging port and a service adapter wherein the charging port and service adapter each include self-sealing valves operated by components associated with the other coupling part thereby minimizing the likelihood of opening the valves until the proper coupling interconnection has taken place.

Another object of the invention is to provide a refrigeration service coupling employing a self-sealing service adapter having both a manually operated valve serially associated with an automatically operated sleeve valve which can only be opened upon the service adapter being properly attached to the charging port.

An additional object of the invention is to provide a refrigeration service coupling employing a charging port connected to the refrigeration circuit and having a self-closing poppet type valve wherein the valve operation and movement is accurately controlled to assure proper valve sealing, and the charging port is rendered substantially tamper proof.

In the practice of the invention the refrigeration service coupling basically consists of a charging port permanently attached to the refrigeration system and in communication therewith. The charging port incorporates a self-sealing, spring biased, valve biased into the closed no flow condition.

The service adapter is connected by a flexible hose or the like to a refrigerant supply source, such as a pressurized bottle or cylinder. The service adapter includes a manually positionable valve having a seal axially displaceable within the adapter fluid passage. A spring biases a sleeve valve into engagement with the manually operated valve seal wherein the spring will maintain the adapter passage closed under all conditions when the adapter is not connected to the charging port.

A quick-release interconnection is preferably utilized between the charging port and service adapter, and upon a complete interconnection therebetween the automatic spring biased closing action of the service adapter sleeve valve is rendered inoperative by engagement of the sleeve valve with the charging port. Thereupon, manual actuation of the service adapter valve permits the valve to be opened and refrigerant supplied to the refrigeration circuit through the charging port as the adapter valve includes an extension for displacing the charging port self-sealing valve to an open condition as the service adapter valve is also opened.

The charging port communicating with the refrigeration circuit includes a spring biased poppet valve reciprocally positioned within a cylindrical passage. The valve is provided with axially extending passages and includes a fluted stem surrounded by a compression spring. The close tolerances between the spring and the stem maintains a coaxial alignment of the charging port valve within its associated passage insuring dependable operation, and the compression spring, once installed, is anchored in position by a swaging or metal deformation of the charging port rendering the valve dependable and substantially tamper proof.

BRIEF DESCRIPTION OF THE DRAWINGS

The aforementioned objects and advantages of the invention will be appreciated from the following description and accompanying drawings wherein:

FIG. 4A is an enlarged detail of the portion of the charging port indicated in FIG. 4, FIG. 6 is a sectional view similar to FIG. 5 illustrating both coupling part valves in an open mode, and FIG. 7 is a sectional view of the service adapter, the manual valve being positioned inwardly to the maximum extent, and the sleeve valve being displaced its maximum extent toward the service adapter open end.

DESCRIPTION OF THE PREFERRED EMBODIMENT

Figure 1:
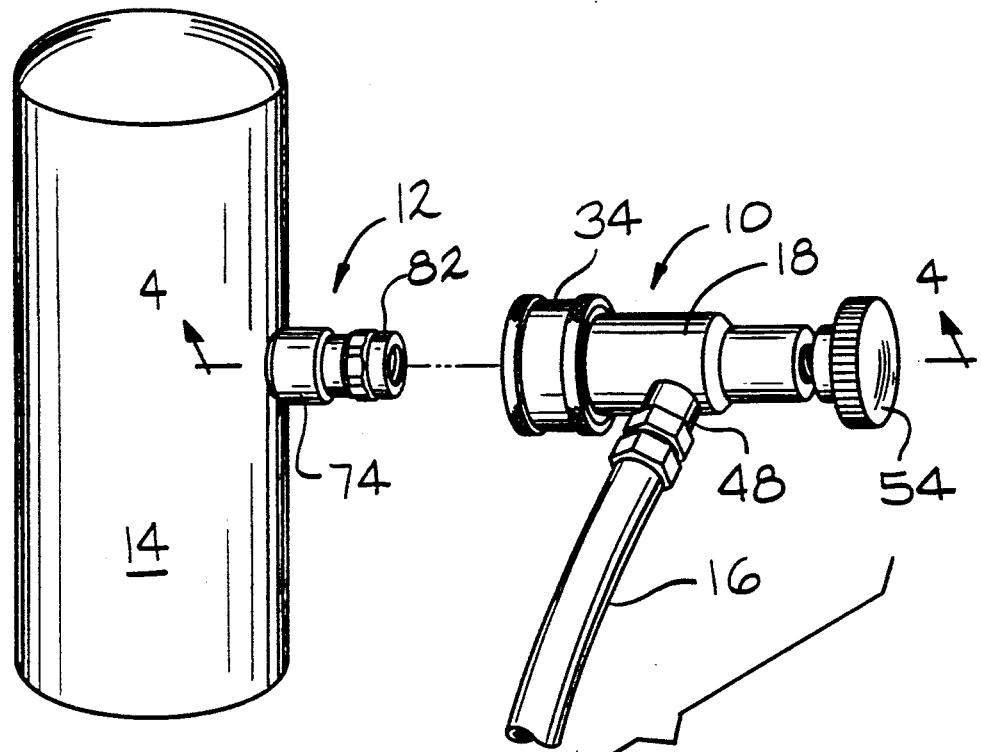
FIG. 1 is a perspective view of a refrigeration service coupling in accord with the present invention, the service adapter being separated, and in alignment with, the charging port communicating with the refrigeration circuit illustrated.

With reference to FIG. 1, the service adapter is illustrated at 10, and is intended to be selectively connected to the charging port, generally indicated at 12, which is mounted upon the refrigeration circuit component 14 as will be later described. The circuit component 14 may constitute tubing, a reservoir, or other component normally found in a refrigeration circuit such as commonly used for air conditioning. It is to be understood that the primary purpose of the apparatus is for the servicing of refrigeration systems such as charging the systems with the proper refrigerant, or purging the refrigerant from the refrigeration system.

Refrigerant is supplied to the service adapter 10 by a flexible supply hose, 16, typically connected to a bottle or cylinder, not shown, containing pressurized refrigerant.

Figure 4:
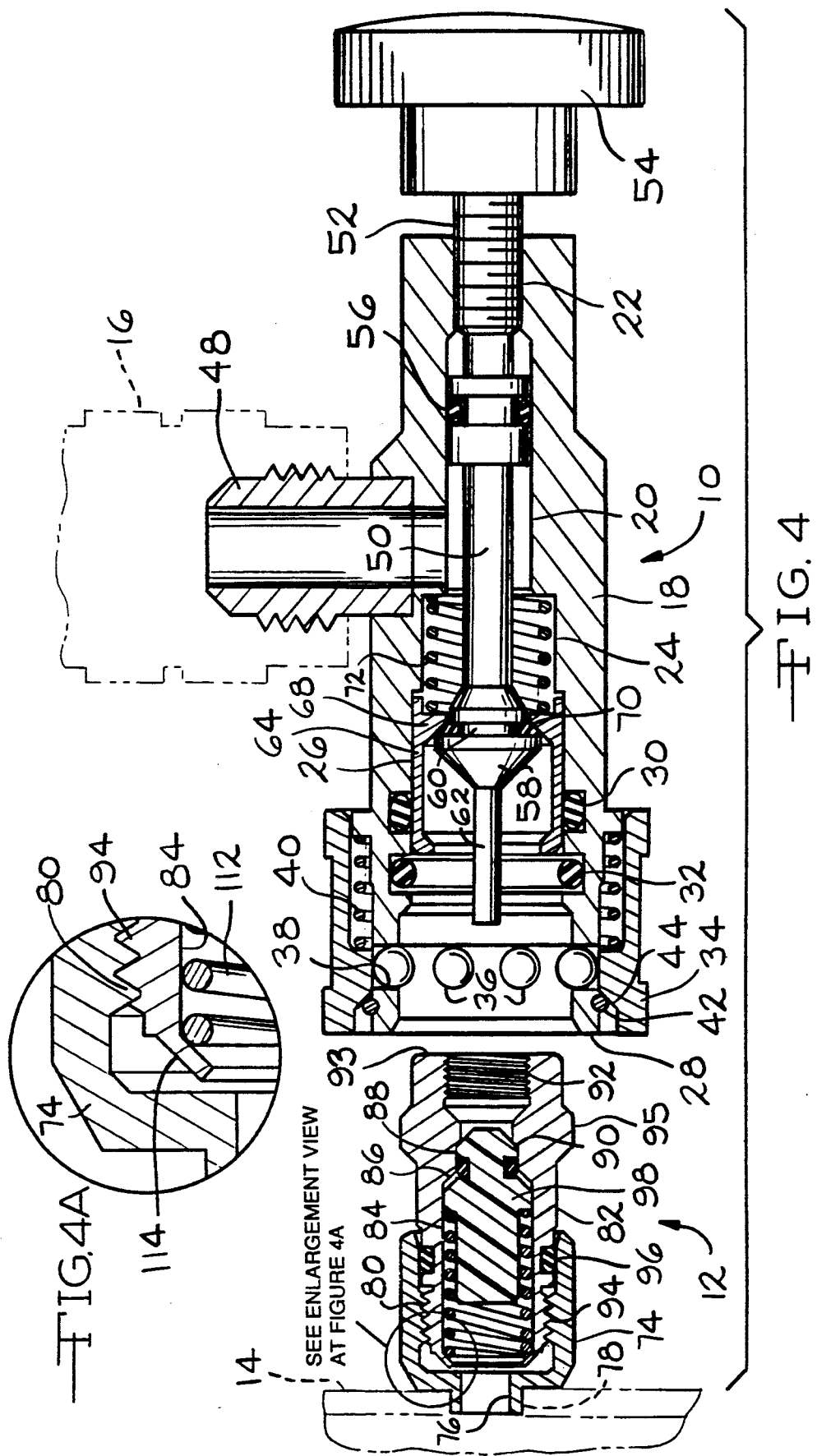
FIG. 4 is a sectional view of the charging port and the service adapter in an aligned but separated mode, the valves of both coupling parts being closed.

Referring now to FIG. 4, the adapter body 18 is of a generally cylindrical configuration and includes a central cylindrical passage 20 having a coaxial threaded bore portion 22, a smooth bore spring chamber portion 24, a larger diameter valve sleeve chamber portion 26, and the passage terminates in the open charging port part receiving connection end 28 which selectively receives the charging port 12.

The passage portion 26 includes an inner elastomeric annular seal 30 and an outer elastomeric seal 32 for purposes later described.

The service adapter 10 is connected to the charging port 12 by an annular locking sleeve 34 slidably and axially displaceable upon the exterior of the end 28. The locking sleeve 34 is adapted to radially position the plurality of detent balls 36 located within the radial holes 38 defined in the body 18. The holes 38, inwardly, are of a diameter slightly less than the diameter of the ball detents preventing the balls from inwardly falling radially inward from the holes as is well known. The locking sleeve 34 is biased toward the connection end 28 by the compression spring 40, and a stop clip 42 located within a recess in body 18 selectively engages the conical cam surface 44 to limit movement of the locking sleeve 34 to the left. A cylindrical detent ball retaining surface 46 is defined upon the locking sleeve 34 which is radially aligned with balls 36 and biases the balls inwardly when the service adapter 10 and charging port 12 are interconnected.

The refrigerant supply hose 16 communicates with the passage 20 by means of the radial hose fitting 48 brazed to the body 18 whereby refrigerant will be supplied to the passage 20.

A manual valve 50 is located within the passage portions and includes a threaded portion 52 for cooperating with the bore threads 22. The valve 50 may be manually rotated in either direction by the knob 54 whereby rotation of the knob and valve will axially displace the valve components within the passage portions. An elastomeric annular seal 56 located between appropriate shoulder portions seals the valve against refrigerant escape past the threads 22 and 52.

At its outer end, the valve 50 includes an enlarged valve head 58 having a concentric groove defined thereon for receiving the elastomeric seal ring 60. The outer end of the valve 50 includes the axial extension 62 which extends well beyond the valve head 58.

An annular sleeve valve 64 of cylindrical configuration is axially displaceable within the passage chamber 26, and is sealed thereto by the engagement with seal 30. The sleeve valve 64 includes an outer end 66, and a base 68 is defined adjacent the inner end of the sleeve valve having a conical concentric valve seat 70 defined therein adapted to seal with the valve head seal ring 60. A compression spring 72 located within chamber 24 engages the sleeve valve 64 and baises the sleeve valve toward the connection end 28 and the spring 72 insures that, under most conditions, the valve seat 70 engages the seal ring 60 in a fluid tight manner.

The charging port 12 includes an annular cup 74 having a stud 76 which is brazed, soldered, or otherwise received within the hole 78 defined in the refrigeration circuit component 14 upon which the coupling part 12 is mounted. Interiorly, the cup is threaded at 80.

Charging port 12 includes a body 82 having a cylindrical bore 84, and the bore 84 includes a shoulder at 86, and a reduced diameter cylindrical valve seat 88 having a conical shoulder 90. The open end of the body 82 may be internally threaded at 92 to receive a dust cap, the body has an end 93, and the exterior of the body 82 is threaded at 94 whereby the body 82 may be located within the cup 74 by threads 80, and sealed thereto by seal 96. An annular enlarged shoulder 95 defined o the exterior of body 82 serves to cooperate with detents 36 as later described.

An axially displaceable poppet valve 98 is mounted within bore 84 and includes a head 100 having a groove defined therein for receiving the annular elastomeric seal 102. When the valve 98 is closed, the seal 102 will be received within the cylindrical seat 88 and seal the part 12 against fluid flow therethrough. When the poppet valve 98 is closed the valve shoulder 104 will engage the bore shoulder 90.

Figure 2:
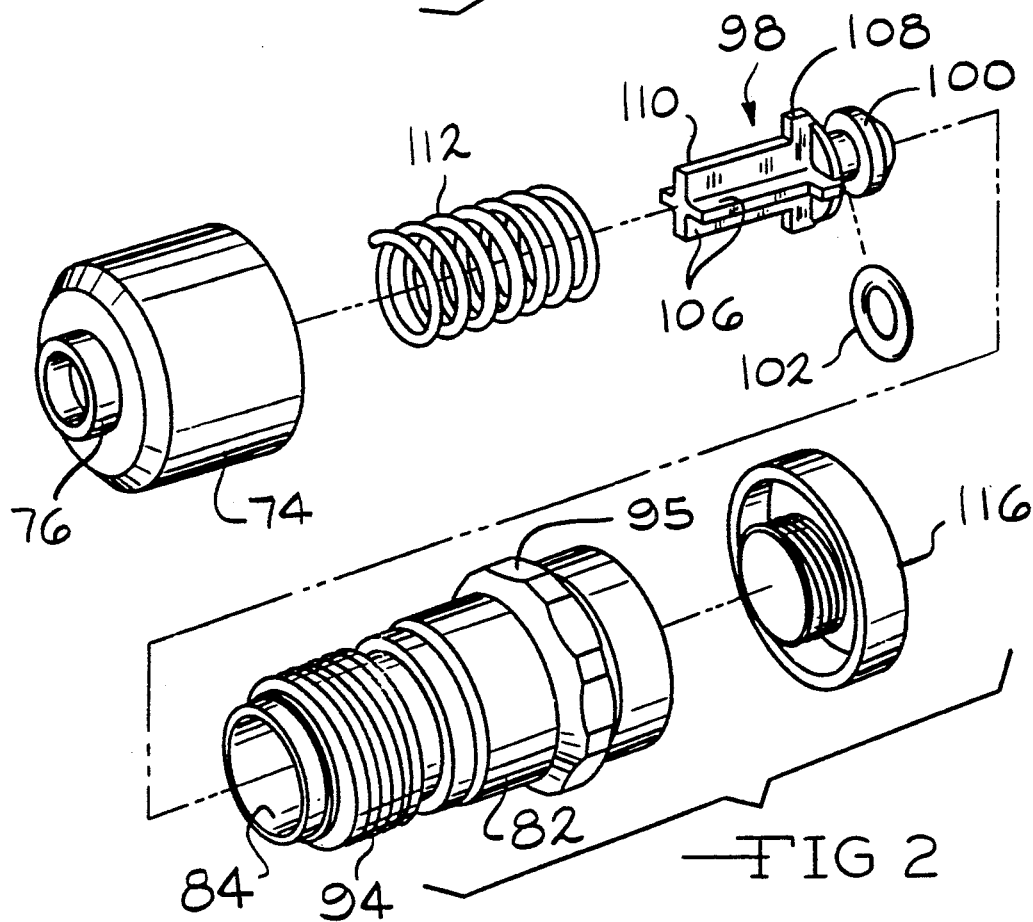
FIG. 2 is an exploded perspective view of the charging port.
Figure 3:
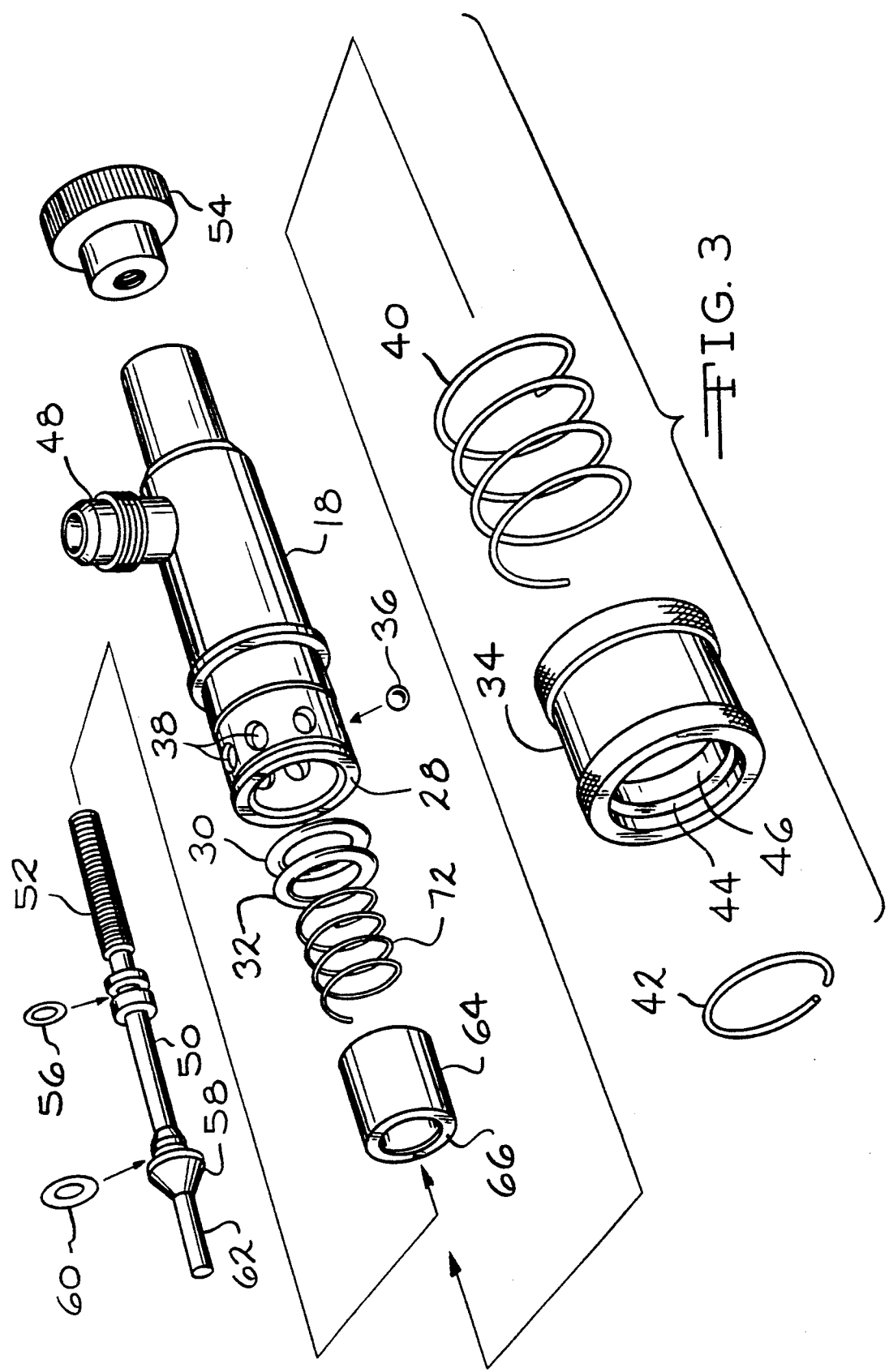
FIG. 3 is an exploded perspective view of the service adapter.

The poppet valve 98 includes a stem 105 defined by four axially extending flutes 106, FIG. 2, each having a maximum diameter at 108 and an inner diameter or edge 110 of a diametrical dimension less than the diameter 108. A compression spring 112 circumscribes the flute diameters 110 and has an internal diameter only slightly larger than the flute diameters 110. The external diameter of the spring 112 is only slightly less than the diameter of the bore 84, and the compression spring 112 is interposed between the flute shoulders defined by the diameters 108 and 110, and a inwardly radially deformed annular lip 114 formed of the material of the body 82.

When assembling the charging port 12, the lip 116 is of a cylindrical configuration providing an inner diameter equal to that of bore 84. Accordingly, the poppet valve 98 and the spring 112 may be easily inserted within the bore 84. Once the poppet valve and spring are located within the bore 84, the cylindrical lip may be radially deformed inwardly as shown in detail in FIG. 4A, and this inward deflection of the lip 114 comprises an effective anchor or shoulder against which the spring 112 may bear, and also, renders the components of the body 12 substantially tamper proof as the poppet valve 98 and spring 112 cannot be removed from the body 82 without re-deforming the lip 114.

When it is desired to attach the service adapter 10 to the charging port 12 for the purpose of charging the refrigeration circuit component 14 with refrigerant, or for removing the refrigerant from the component 14, the service coupling parts 10 and 12 will be aligned as shown in FIGS. 1 and 4 after the dust cap 116 has been removed from threads 92. The locking sleeve 34 is axially displaced toward the knob 54 against the spring 40 so as to radially align the locking sleeve cam surface 44, and its adjacent maximum clearance, with the balls 36 permitting the ball detents to be outwardly radially displaceable as the adapter 10 is inserted over the charging port 12 and the balls pass over the enlarged diametrical shoulder 95 defined on the body 82. After the ball detents 36 have passed over the shoulder 95 the locking sleeve 34 is permitted to return to the position shown in FIG. 5 wherein surface 46 radially aligns with the balls 36 and the cam surface 44 engages the stop clip 42. Thereupon, the service adapter 10 will be locked to the charging port 12 as shown in FIG. 5 and the nose of body 82 will be sealed to body 18 by seal ring 32.

Figure 5:
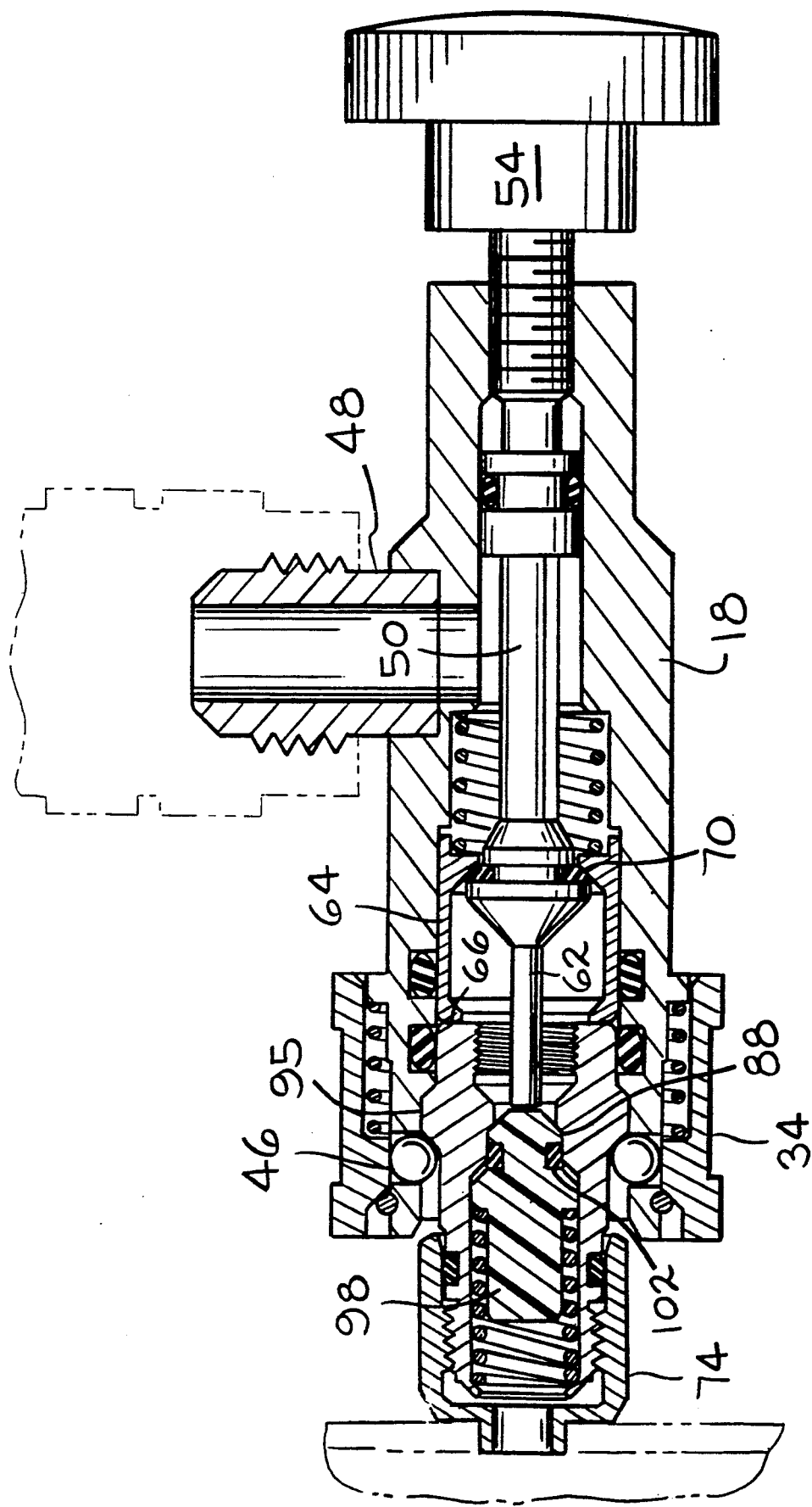
FIG. 5 is a sectional view of the charging port and service adapter fully connected, the adapter valve and the charging port poppet valve being illustrated in the closed no flow mode.

With reference to FIG. 5, it will be noted that the sleeve valve end 66 is just engaging the charging port body end 93 and the end of the extension 62 of the manual valve 50 is about to engage the outer end of the poppet valve 98. However, under the conditions shown in FIG. 5 the seal ring 60 is engaging the valve seat 70 and the poppet valve seal 102 is sealingly received within the seat 88, and both the parts 10 and 12 are sealed against fluid flow therethrough.

Upon rotation of the valve 50 clockwise by the knob 54 to displace the valve 50 to the left, FIG. 6, the extension 62 will engage and open the poppet valve 98 as illustrated, and the seal 102 is fully removed from the seat surface 88. Simultaneously, the valve head seal ring 60 separates from the valve sleeve seat 70 and refrigerant may flow through the passage portions of the body 18 into the body 82 and through the flutes of the poppet valve 98 into the refrigeration circuit component 14.

Under the above "valves open" condition it will be appreciated that movement of the sleeve valve 64 to the left, FIG. 6, under the influence of the spring 72, is prevented due to engagement of the sleeve valve end 66 with the end 93 of the charging port body 82.

With the components in the valves open condition shown in FIG. 6 the flow of refrigerant through the service coupling parts 10 and 12 takes place, in the desired direction, and when it is desired to terminate refrigerant flow the knob 54 of manual valve 50 is rotated in a counterclockwise direction to return the components to the positions shown in FIG. 5. The poppet valve seal 102 will again be received within seat 88, and the seal ring 60 will engage the valve seat 70. Thereupon, the operator may manually displace the locking sleeve 34 to the right, FIG. 5, to remove retainer surface 46 from the ball detents 36 permitting the balls to be displaced outwardly as they ride over the backside conical surface of the shoulder 95, and the coupling parts 10 and 12 may be fully separated with the valves of both parts being fully closed without significant loss of refrigerant to the atmosphere.

If the manual valve 50 is rotated in a clockwise "open" direction without the service adapter 10 being attached to the charging port 12 as described above, the movement of the manual valve 50 to the left, FIG. 7, permits the sleeve valve 64 to move toward the charging port connection end 28 under the influence of the compression spring 72. However, as the spring 72 will maintain engagement of the valve seat 70 upon the seal ring 60 no flow of refrigerant from the passage 20 is possible, and the valve 50 and sleeve valve 64 remain closed, even though the valve 50 has been rotated to its maximum "open" position. This safety feature eliminates the possibility of inadvertent discharge of refrigerant into the atmosphere.

Refrigeration servicing apparatus as described above will normally be used with refrigeration systems using environmentally acceptable refrigerants such as R 134A. As the interconnect between the parts 10 and 12 is of a quick-connect type, and does not utilize threads, it is very difficult for a service person to inadvertently attach the service adapter 10 upon an improper charging port, such as a Schrader valve. Even if the service person endeavored to connect the service adapter 10 to an improper charging port such charging port would not be properly dimensioned to engage the end 66 of the sleeve valve 64 and, hence, even if the manual valve 50 was rotated to its open position as shown in FIG. 7 the sleeve valve 64 would prevent fluid flow through the service adapter 10. Accordingly, a refrigeration service system utilizing the aforedescribed service coupling parts eliminates the inadvertent intermixing of incompatible refrigerants, reduces the likelihood of malfunctioning of the service coupling parts, and prevents inadvertent release of refrigerant to the atmosphere even if the manual valve 50 is opened before the service coupling parts are fully connected.

It is appreciated that various modifications to the inventive concepts may be apparent to those skilled in the art without departing from the spirit and scope of the invention.

We claim:

1. A coupling particularly suitable for servicing refrigeration systems comprising, in combination, a service adapter part, a charging port part, axial flow passages defined in each of said parts, a conduit fitting attached to said service adapter part in communication with said passage thereof, releasable locking means mounted upon one of said parts adapted to selectively lock to the other part to lock said parts in an aligned interconnected relationship, a manually actuated axially displaceable valve within said service adapter part, means for axially displacing said valve between first and second axial position, a self-sealing valve located within said charging port part passage, spring means biasing said self-sealing valve toward a closed condition, and interlock means located within said service adapter passage maintaining said service adapter part valve in a closed condition regardless of the position of said valve, said interlock means engaging said charging port part when said service adapter part is fully connected on said charging port part and such engagement deactivating aid interlock means whereby said manually actuated valve controls fluid flow through said service adapter part passage, said interlock means within said service adapter part comprising an annular sleeve valve axially displaceable within said service adapter part passage, spring means within said service adapter part passage biasing said sleeve valve into a closed relationship with said adapter part valve, said sleeve valve adapted to engage said charging port part upon said parts being fully interconnected, said engagement axially retaining said sleeve valve against displacement by said spring means.

2. In a coupling suitable for servicing refrigeration systems as in claim 1, seal means defined upon said service adapter part valve, an annular valve seat defined upon said sleeve valve, said sleeve valve spring means biasing said sleeve valve valve seat toward engagement with said valve seal means.

3. In a coupling suitable for servicing refrigeration systems as in claim 2, said service adapter valve including an axial extension adapted to engage and displace said charging port part self-sealing valve upon positioning of said service adapter part valve in said second position upon said parts being fully interconnected.

4. In a service adapter for adding refrigerant to a refrigeration system comprising a service adapter body, an axial flow passage defined in said body, a conduit fitting defined on said service adapter body in communication with said passage, releasable locking means within said body adapted to selectively lock said body in an aligned interconnected relationship with a compatible charging port, the improvement comprising a manually actuated axially displaceable valve within said service adapter body, means for axially displacing said valve between first and second axial positions, interlock means located within said service adapter body passage maintaining said manually actuated valve in a closed condition regardless of the axial position of said manually actuated valve, said interlock means engaging a charging port when said service adapter body is fully connected thereto and such engagement deactivating said interlock means whereby said manually actuated valve controls fluid flow through said service adapter body passage, said interlock means within said service adapter body comprising an annular sleeve valve axially displaceable within said service adapter body passage, spring means within said service adapter body passage biasing said sleeve valve into a closed relationship with said manually actuated valve, said sleeve valve adapted to engage a charging port upon said service adapter body being fully interconnected thereto, said engagement axially retaining said sleeve valve against displacement by said spring means.

5. In a service adapter for servicing refrigeration systems as in claim 4, seal means defined upon said manually actuated valve, an annular valve seat defined upon said sleeve valve, said sleeve valve spring means biasing said sleeve valve valve seat toward engagement with said valve seal means.

6. In a service adapter for servicing refrigeration systems as in claim 4, an axial charge port valve engaging extension defined on said manually actuated valve extending through said sleeve valve.

* * * * *

UNITED STATES PATENT AND TRADEMARK OFFICE
CERTIFICATE OF CORRECTION

PATENT NO. : 5,139,049

DATED : August 18, 1992

INVENTOR(S) : Jon A. Jensen, Steven M. Knowles, Robert A. Laipply

It is certified that error appears in the above-identified patent and that said Letters Patent is hereby corrected as shown below:

On the title page: Item [75] Inventors: amend the following to read

-- Jon A. Jensen, New Baltimore; Steven M. Knowles, Leslie;
   Robert A. Laipply, Parma; and John D. Boland, Jackson, all of Michigan Column 6, line 24, claim 1, cancel "aid" and substitute --said --

Signed and Sealed this

Seventh Day of December, 1993

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,139,049
DATED : August 18, 1992
INVENTOR(S) : Jon A. Jensen, Steven M. Knowles, Robert A. Laipply and John D. Boland It is certified that error appears in the above-indentified patent and that said Letters Patent is hereby corrected as shown below:

The drawing sheet, consisting of Figure 6 and 7, should be added as shown on the attached page.

Signed and Sealed this

Twenty-sixth Day of April, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,139,049

DATED : August 18, 1992

INVENTOR(S) : Jon A. Jensen, Steven M. Knowles, Robert A. Laipply and John D. Boland Page 2 of 3

It is certified that error appears in the above-indentified patent and that said Letters Patent is hereby corrected as shown below:

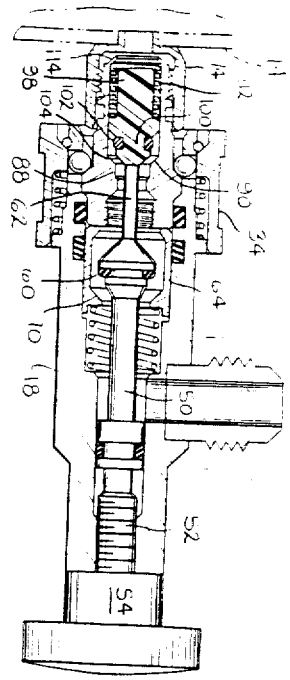

UNITED STATES PATENT AND TRADEMARK OFFICE
CERTIFICATE OF CORRECTION

PATENT NO. : 5,139,049
DATED : August 18, 1992
INVENTOR(S) : Jon A. Jensen, Steven M. Knowles, Robert A. Laipply and John D. Boland Page 3 of 3

It is certified that error appears in the above-indentified patent and that said Letters Patent is hereby corrected as shown below:

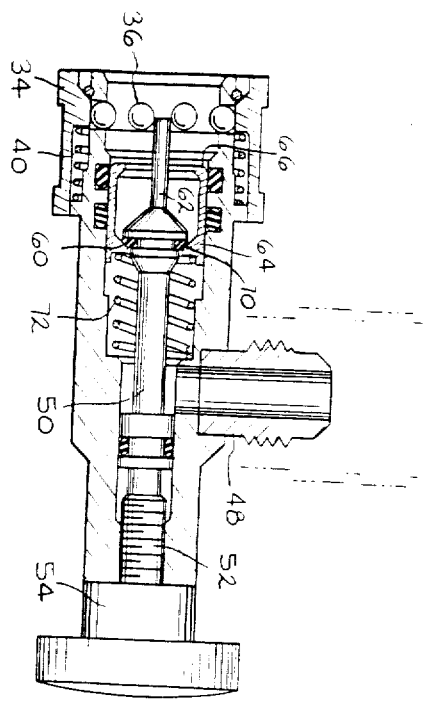

FIG. 7